United States Patent
Thatcher et al.

(10) Patent No.: US 6,425,069 B1
(45) Date of Patent: Jul. 23, 2002

(54) OPTIMIZATION OF INSTRUCTION STREAM EXECUTION THAT INCLUDES A VLIW DISPATCH GROUP

(75) Inventors: Larry Edward Thatcher, Austin; John Edward Derrick, Round Rock, both of TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/263,664

(22) Filed: Mar. 5, 1999

(51) Int. Cl.[7] ............................................. G06F 15/00
(52) U.S. Cl. .................... 712/24; 712/218; 712/219; 712/228
(58) Field of Search .................... 712/24, 228, 244, 712/238, 218, 219, 229

(56) References Cited

U.S. PATENT DOCUMENTS

| | | | |
|---|---|---|---|
| 4,236,206 A | | 11/1980 | Strecker et al. |
| 4,502,111 A | | 2/1985 | Riffe et al. |
| 5,226,164 A | | 7/1993 | Nadas et al. |
| 5,233,696 A | | 8/1993 | Suzuki |
| 5,689,672 A | | 11/1997 | Witt et al. |
| 5,742,783 A | | 4/1998 | Azmoodeh et al. |
| 5,748,978 A | | 5/1998 | Narayan et al. |
| 5,778,432 A | * | 7/1998 | Rubin et al. ................ 711/135 |
| 5,809,272 A | | 9/1998 | Thusoo et al. |
| 5,809,273 A | | 9/1998 | Favor et al. |
| 5,822,575 A | | 10/1998 | Tran |
| 5,930,508 A | * | 7/1999 | Faraboschi et al. ......... 395/706 |
| 5,961,636 A | | 10/1999 | Brooks et al. |
| 6,032,244 A | * | 2/2000 | Moudgill ..................... 712/23 |
| 6,044,450 A | * | 3/2000 | Tsushima et al. ............. 712/24 |
| 6,092,176 A | * | 7/2000 | Iadonato et al. .............. 712/23 |
| 6,108,774 A | | 8/2000 | Muthusamy |
| 6,122,722 A | * | 9/2000 | Slavenburg .................. 712/24 |
| 6,170,051 B1 | | 1/2001 | Dowling |
| 6,175,910 B1 | * | 1/2001 | Pauporte et al. ............ 712/217 |

* cited by examiner

Primary Examiner—Mark Zimmerman
Assistant Examiner—Mackly Monestime
(74) Attorney, Agent, or Firm—Sawyer Law Group LLP; Anthony V.S. England (57) ABSTRACT

A method and system for optimizing execution of an instruction stream which includes a very long instruction word (VLIW) dispatch group in which ordering is not maintained is disclosed. The method and system comprises examining an access which initiated a flush operation; capturing an indice related to the flush operation; and causing all storage access instructions related to this indice to be dispatched as single-IOP groups until the indice is updated. Storage access to address space which is safe such as Guarded (G=1) or Direct Store (E=DS) must be handled in a non-speculative manner such that operations which could potentially go to volatile I/O devices or control locations that do not get processed out of order. Since the address is not known in the front end of the processor, this can only be determined by the load store unit or functional block which performs translation. Therefore, if a flush occurs for these conditions, in accordance with the present invention the value of the base register (RA) is latched and subsequent loads and stores which use this base register are decoded in a "safe" manner until an instruction is decoded which would change the base register value (safe means an internal instruction sequence which can be executed in order without repeating any accesses). The value of multiple base registers can be tracked in this manner, though the preferred embodiment would not use more than two, one of the base registers could be for input and one could be for output streams.

6 Claims, 7 Drawing Sheets

Number
| | | |
|---|---|---|
| 1 | LO | R10, R11, #244 |
| 2 | ADD | R10, R10, #8 |
| 3 | LO | R10, R11, #238 |
| 4 | ADD | R10, R10, #8 |
| 5 | LO | R10, R11, #230 |
| 6 | ADD | R11, R0, #128 |
| 7 | LO | R9, R11, #0 |
| 8 | ADDI | R9, R9, #8 |
| 9 | ADD | |
| 10 | LDU | R8, R11, #16 |

R11=RA (Base Register)

Group #1 (lines 1–4)

Group #2 (lines 5–8)

OPTIMIZATION OF INSTRUCTION STREAM EXECUTION THAT INCLUDES A VLIW DISPATCH GROUP

CROSS-REFERENCE TO RELATED APPLICATIONS

The present application is related to applications Ser. No. 09/263,663, entitled "A Method and System for Optimizing the Fetching of Dispatch Groups in a Superscalar Processor", filed Mar. 5, 1999; Ser. No. 09/263,667, entitled "An Instruction Buffer Arrangement for a Superscalar Processor", filed Mar. 5, 1999; Ser. No. 09/263,669, entitled "A Simplified Method to Generate BTAGs in a Decode Unit of a Processing System", filed Mar. 5, 1999; Ser. No. 09/263,666, entitled "Destructive Operation Optimization for Operations Which Modify Partial Datums", filed Mar. 5, 1999; Ser. No. 09/263,670, entitled "Fast Microcode/Branch Selector Scheme", filed Mar. 5, 1999; and Ser. No. 09/263,668, entitled "A System and Method for Utilizing a Conditional Split for Aligning Internal Operations (IOPs) for Dispatch", filed Mar. 5, 1999.

FIELD OF THE INVENTION

The present invention relates generally to a superscalar processor with very long instruction word (VLIW)-like dispatch groups and more particularly to the decode and treatment of instructions which access volatile address space.

BACKGROUND OF THE INVENTION

Superscalar processors employ aggressive techniques to exploit instruction-level parallelism. Wide dispatch and issue paths place an upper bound on peak instruction throughput. Large issue buffers are used to maintain a window of instructions necessary for detecting parallelism, and a large pool of physical registers provides destinations for all of the in-flight instructions issued from the window beyond the dispatch boundary. To enable concurrent execution of instructions, the execution engine is composed of many parallel functional units. The fetch engine speculates past multiple branches in order to, supply a continuous instruction stream to the decode, dispatch and execution pipelines in order to maintain a large window of potentially executable instructions.

The trend in superscalar design is to scale these techniques: wider dispatch/issue, larger windows, more physical registers, more functional units, and deeper speculation. To maintain this trend, it is important to balance all parts of the processor-any bottlenecks diminish the benefit of aggressive techniques, however data dependent decode very adversely affects the performance gains of these techniques.

Figure 1:
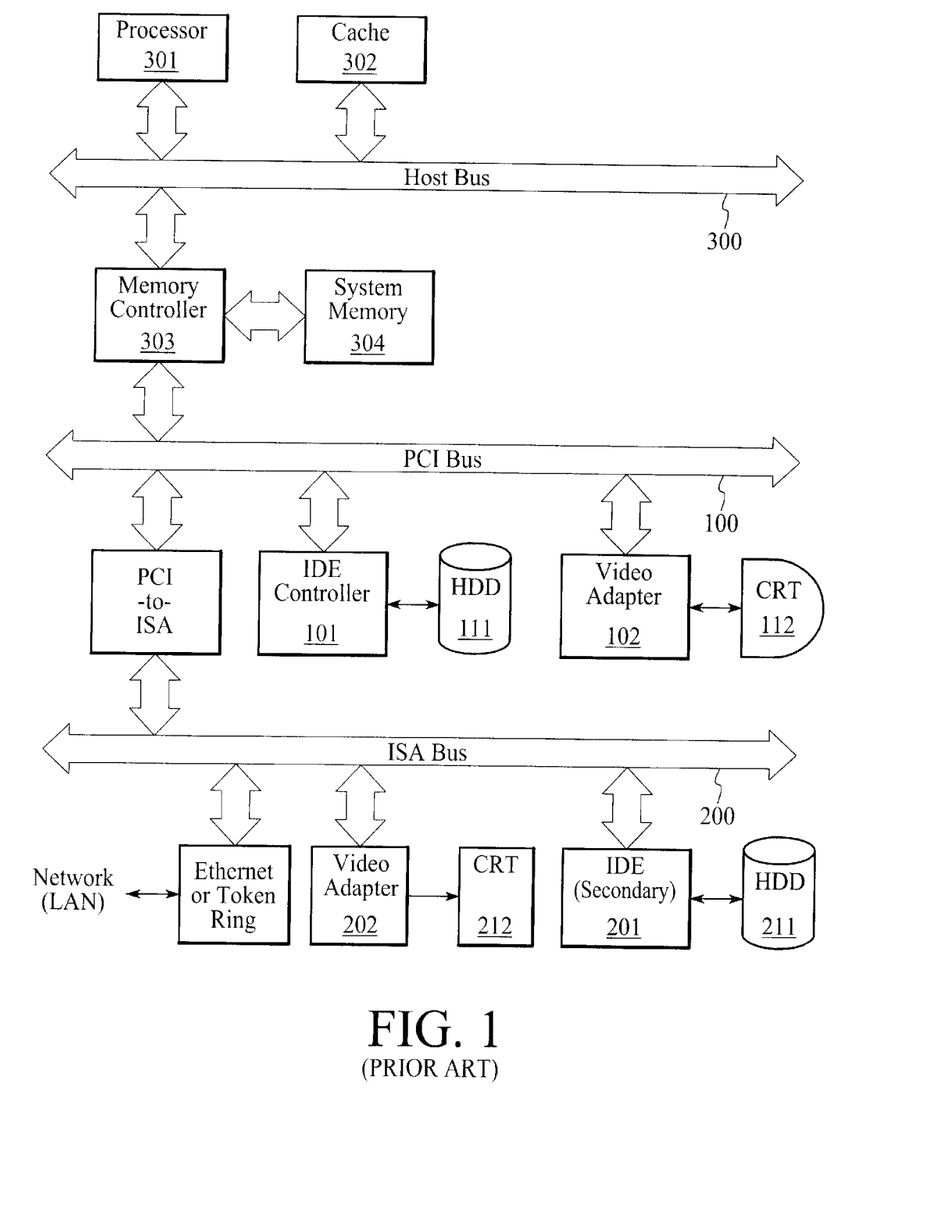
FIG. 1 illustrates a block diagram of a typical processing system.

FIG. I illustrates a block diagram of a typical processing system. The processing system includes a processor 301 and a cache 302 which communicates with a host bus 300. The host bus also communicates with a memory controller 303 which in turn provides and receives information from the system memory 304. The memory controller 303 in turn communicates with another bus, in this example a PCI bus 100. The PCI bus communicates with an IDE controller which in turn is connected to a hard disk drive 111. Also the PCI bus communicates with a video adapter 102 which is in turn coupled to a CRT 112. PCI bus 100 also is coupled to an ISA bus through a PCI/ISA interface 103. The ISA bus 200 in turn is coupled to an ethernet or TokenRing controller which is coupled to a network or a local area network (LAN). It communicates with another video adapter 202 which has its associated CRT 212 and an IDE controller 201 which is coupled to a hard disk drive 211.

One of the critical bottlenecks in such a processing system is load and store bandwidth, this is particularly true for machines which operate at higher frequencies because of the growing disparity in processor, I/O bus, and main memory operating frequencies. Since most processor architectures which are currently prevalent, x86 (IA-32), PowerPC/AS, ARM, etc., were implemented before this memory/logic frequency disparity became so pronounced, many contain an implementation or manifest some type of volatile I/O space or strongly ordered memory in one or more of their respective system architectures.

This can simply be defined as address space which if accessed multiple times will respond with different data. An example of this would be a memory-mapped FIFO in a video or communications adapter, or a multiplicity of addresses which if accessed in different order will respond with different data.

The requirement that this be supported has a devastating effect on processor implementations and performance because it requires the physical or effective address (depending on the architecture) to be compared against some table, range register, or other checking mechanism to determine if the address can be accessed out-of-order. This is further compounded by attempts at adding wider dispatch groups which optimally can be done in a VLIW-like dispatch group which has no ability to maintain ordering within the dispatch group. Since the actual address is not known at instruction decode time a processor which implements such a VLIW-like dispatch groups must block execution and flush the VLIW-like dispatch group and reformat the individual instructions of the VLIW-like word into the individual instructions forming a safe and lower performance sequence.

In a very high-frequency processor which has a deep pipeline this has an unacceptably high performance penalty for any code stream which might even occasionally access this type of storage.

This problem manifests itself in a processor supporting the PowerPC/AS architecture. Additionally, all addresses within the particular guarded range must be accessed in program order. Guarded is defined in this application as an address which must only be accessed once for each datum. There is no way to distinguish between guarded storage for different adapter/devices so all accesses to guarded space must be performed in strict program order.

Direct storage is different from guarded because a single memory address can be accessed multiple times without changing its value, but the order of accesses must be maintained. The present invention optimizes the performance of this strict architectural requirement in a VLIW-like processor.

SUMMARY OF THE INVENTION

A method and system for optimizing execution of an instruction stream which includes a very long instruction word (VLIW) dispatch group in which ordering is not maintained is disclosed. The method and system comprises examining an access which initiated a flush operation; capturing an indice related to the flush operation; and causing all storage access instructions related to this indice to be dispatched as single IOP groups until the indice is updated.

Storage access to address space which is safe such as Guarded (G=1) or Direct Store (E=DS) must be handled in a non-speculative manner such that operations which could potentially go to volatile I/O devices or control locations that do not get processed out of order. Since the address is not known in the front end of the processor, this can only be determined by the load store unit or functional block which performs translation. Therefore, if a flush occurs for these conditions, in accordance with the present invention the value of the base register (RA) is latched and subsequent loads and stores which use this base register are decoded in a "safe" manner until an instruction is decoded which would change the base register value (safe means an internal instruction sequence which can be executed in order without repeating any accesses). The value of multiple base registers can be tracked in this manner, though the preferred embodiment would not use more than two, one of the base registers could be for input and one could be for output streams.

DESCRIPTION OF THE INVENTION

The present invention relates generally to a superscalar processor and more particularly to a system and method for improving the overall throughput in such a processor. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

A superscalar processor includes a number of stages, such as the following, in the processor pipeline. In a typical first stage, referred to as an instruction fetch stage, an instruction is fetched from memory or associative memory structure, each stage including one or more pipelines. Then, in decode stage, the instruction is decoded into different control bits, which in general designate (1) a type of functional unit for performing the operation specified by the instruction, (2) source operands for the operation, and (3) destinations for results of operations.

In a dispatch stage, the decoded instruction is dispatched per the control bits to a unit having an execution stage, or possibly to an intervening reservation station, which ultimately issues the instruction to an associated execution stage (also "execution unit").

The execution stage processes the operation as specified by the instruction. Executing an operation specified by an instruction includes accepting one or more operands and producing one or more results. Oftentimes the instructions will be out-of-order.

A completion stage deals with program order issues that arise from concurrent execution, wherein multiple, concurrently executed instructions may deposit results in a single register. It also handles recovery issues arising from instructions subsequent to an interrupted instruction depositing results in their destination registers.

Figure 2:
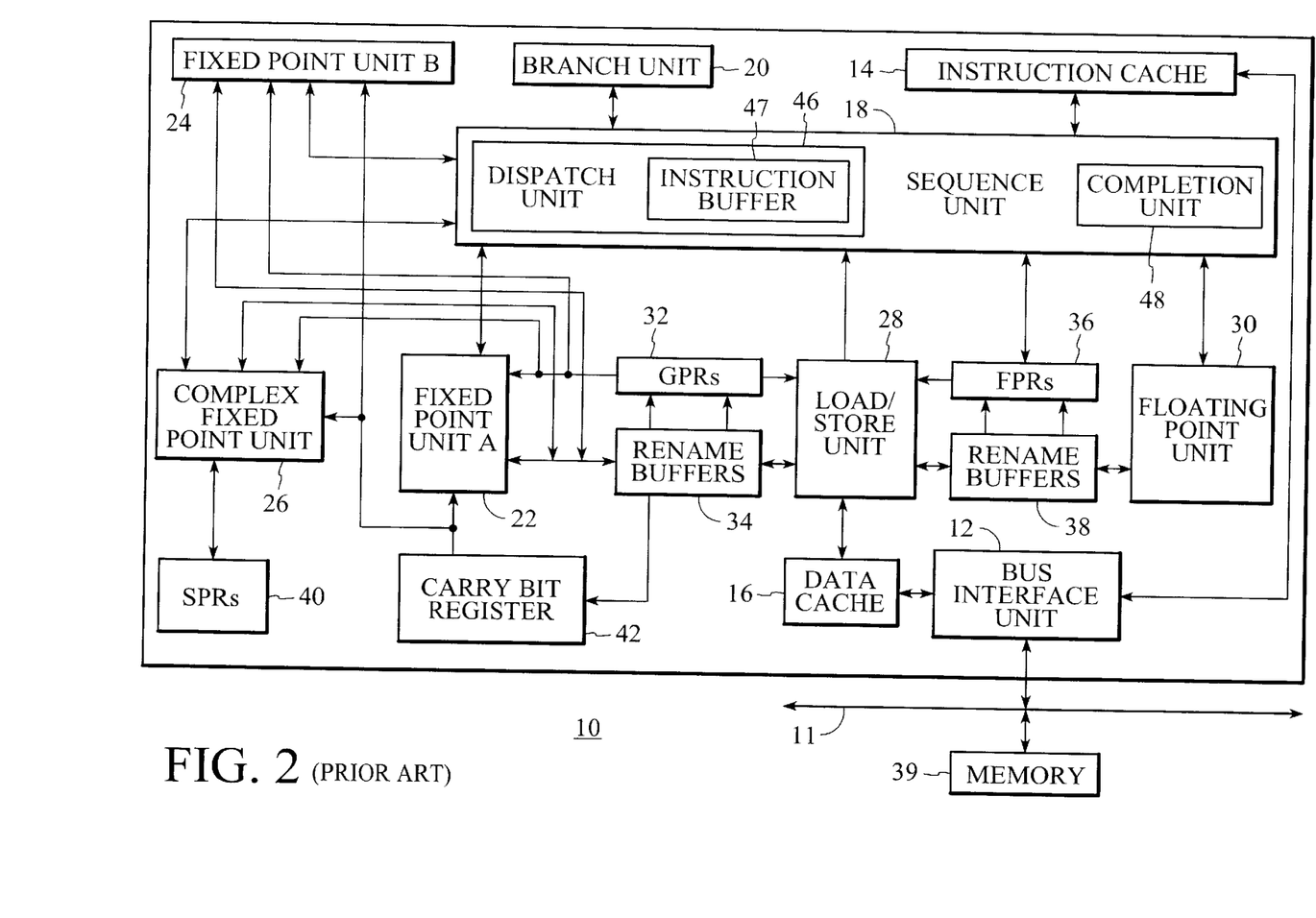
FIG. 2 is a block diagram of a conventional superscalar processor.

FIG. 2 is a block diagram of a conventional superscalar processor 10. As shown, the superscalar processor 10 typically include a system bus 11 connected to a bus interface unit ("BIU") 12. BIU 12 controls the transfer of information between processor 10 and system bus 11. BIU 12 is connected to an instruction cache 14 and to a data cache 16 of processor 10. Instruction cache 14 outputs instructions to a sequencer unit 18. In response to such instructions from instruction cache 14, sequencer unit 18 selectively outputs instructions to other execution circuitry of processor 10.

In addition to sequencer unit 18 which includes execution units of a dispatch unit 46 and a completion unit 48, in the preferred embodiment the execution circuitry of processor 10 includes multiple execution units, namely a branch unit 20, a fixed point unit A ("FXUA") 22, a fixed point unit B ("FXUB") 24, a complex fixed point unit ("CFXU") 26, a load/store unit ("LSU") 28 and a floating point unit ("FPU") 30. FXUA 22, FXUB 24, CFXU 26 and LSU 28 input their source operand information from general purpose architectural registers ("GPRs") 32 and fixed point rename buffers 34. Moreover, FXUA 22 and FXUB 24 input a "carry bit" from a carry bit ("CA") register 42. Also, CFXU 26 inputs and outputs source operand information and destination operand information to and from special purpose registers ("SPRs") 40.

FPU 30 inputs its source operand information from floating point architectural registers ("FPRs") 36 and floating point rename buffers 38. FPU 30 outputs results (destination operand information) of its operation for storage at selected entries in floating point rename buffers 38.

As is seen, the above-identified processor utilizes rename buffers and special purpose registers (SPRs) as a rename pool to keep track of the instructions. This use of a rename pool adds considerable complexity to the superscalar process, particularly as instructions become wider. To index instructions properly, it becomes important to optimize the translation from the complex instruction set with a large amount of implicit information to an explicit instruction set that does not require the use of architected registers. This is particularly true in situations where the internal instructions do not have a direct relationship to the external instructions. Hence, to index instructions properly, it is sometimes important to break those instructions into two instructions or several instructions that may not have a direct relationship to the original instruction to allow for faster execution of such instructions. Accordingly, a unique superscalar processor is provided which removes the rename buffering scheme and replaces it with a rename mapping arrangement.

Figure 3:
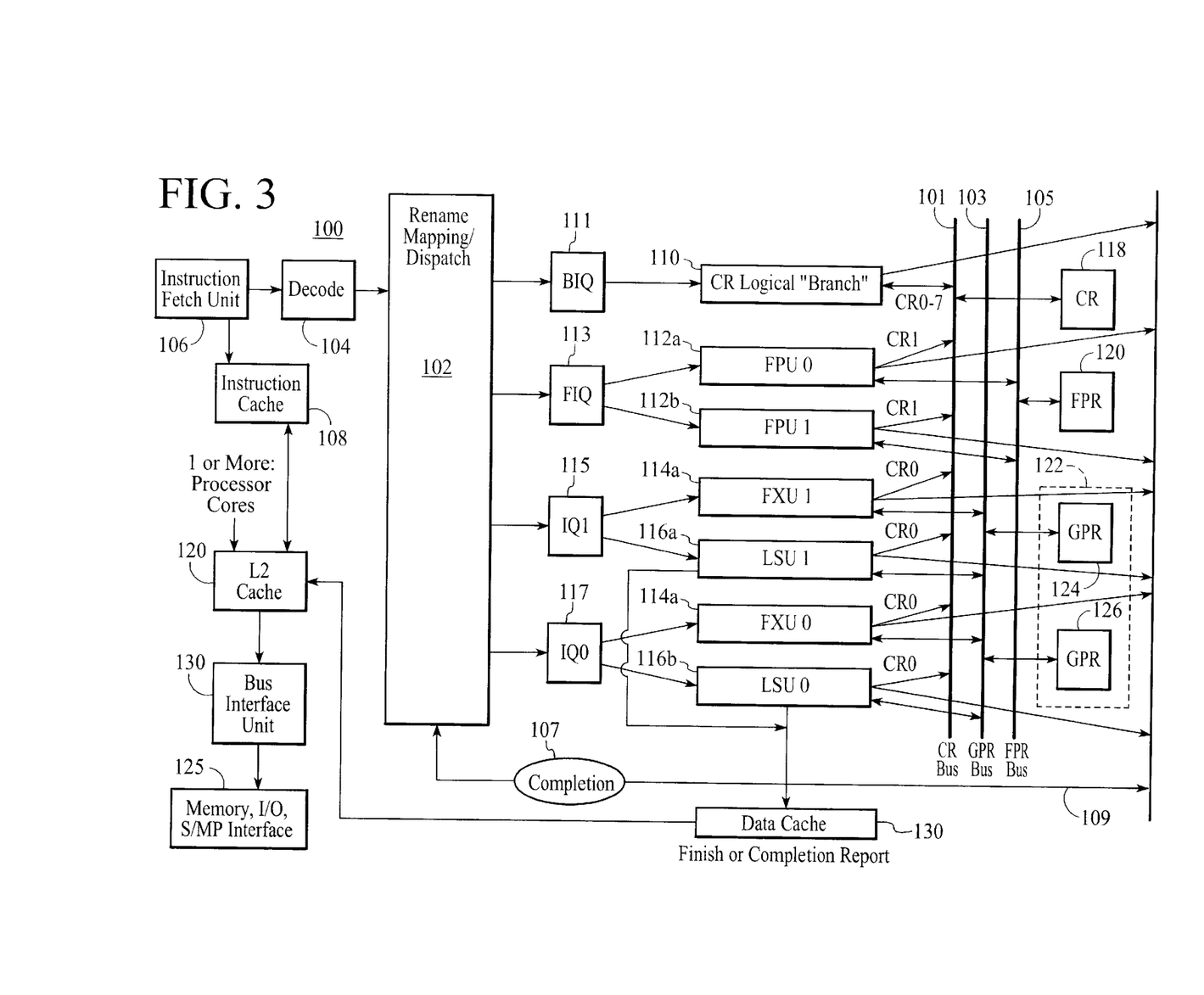
FIG. 3 is a block diagram of a superscalar processor in accordance with the present invention.
Figure 4:
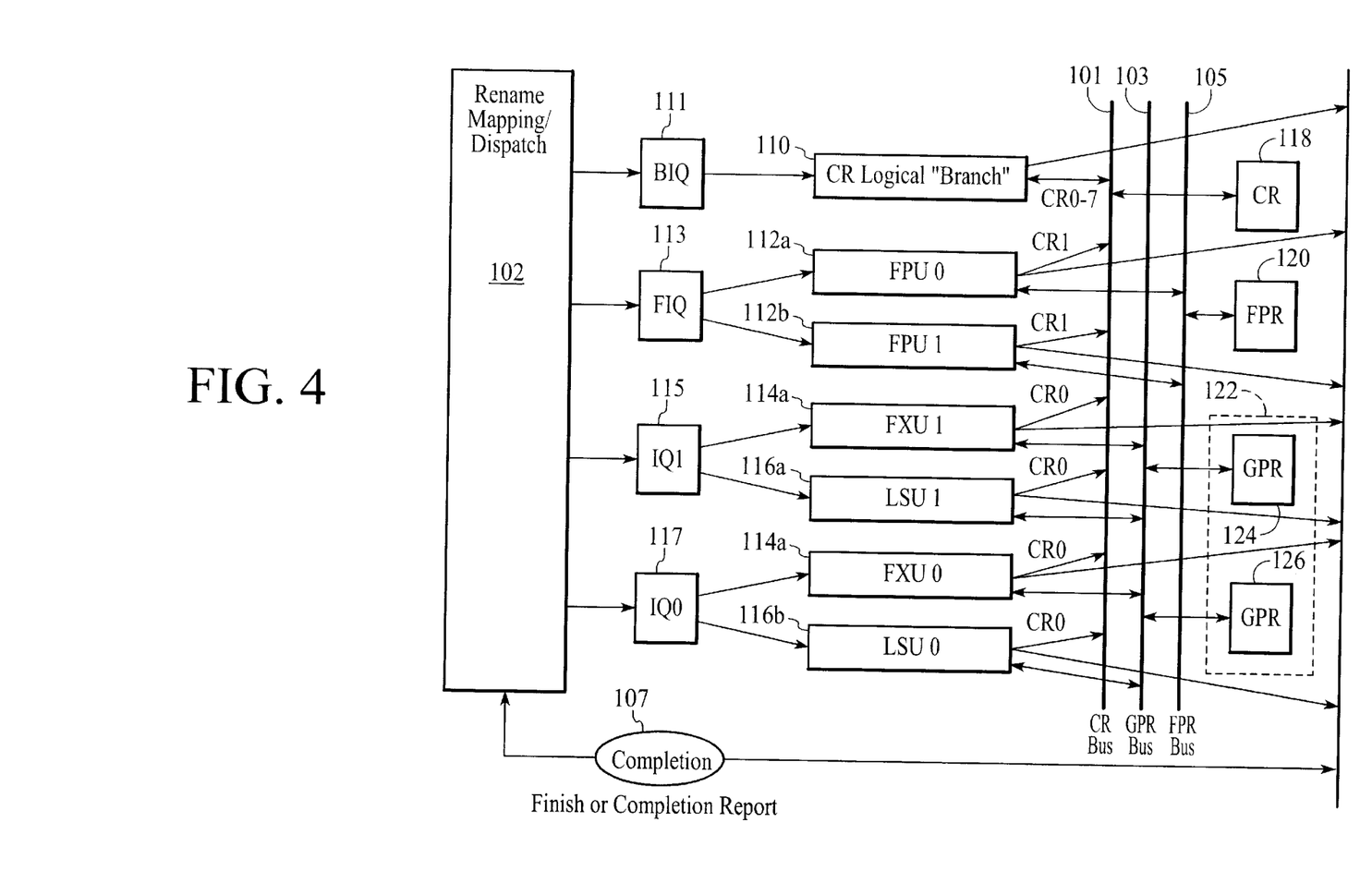
FIG. 4 is an enlarged block diagram illustrating certain portions of the superscalar processor of FIG. 2.

FIG. 3 is a simple block diagram of a superscalar processor 100 in accordance with the present invention. FIG. 4 is an enlarged block diagram illustrating certain portions of the superscalar processor of FIG. 3. The processor includes an instruction fetch unit (IFU) 106 which provides signals to a decode unit 104 which utilizes a rename mapping structure 102. That rename mapping structure 102 provides information directly to issue queues 111–117. The issue queues 111, 113, 115 and 117 in turn feed the execution units 110, 112a–b, 114a–b, and 116a–b.

Instruction cache 108 stores instructions received from the IFU 106. Data cache 130 receives data from the execution units 110–116. A level 2 (L2) cache 120 is utilized to store data and instructions from the data cache 130 and the instruction cache 108. The processor 100 includes a bus interface unit (BIU) 130 which passes information between the L2 cache 120 and the peripheral device interface 125 (i.e., memory, i/o device, mp).

In this embodiment, the branch issue queue (BIQ) 111 provides information to the condition register (CR) logical or branch unit 110. The floating point issue queue (FIQ) 113 provides information to the two floating point units (FPUs) 112a and 112b. Issue queue (IQ) 115 provides information to fixed point unit (FXU) 114a and load/store unit (LSU) 116. IQ 117 provides information to FXU 114b and LSU 116b. Although the issue queues are arranged in the above-identified manner, one of ordinary skill in the art readily recognizes, Conditional register 118 provides and receives information from a CR bus 101. Floating point architectural registers (FPRs) 120 provide and receive information from a FPR bus 105. General purpose registers (GPRs) 124 and 126 provide and receive information from a GPR bus 103. Completion unit 107 provides information to rename mapping 102 via a completion bus 109.

Branch unit 110 provides and receives information via the CR bus 101 utilizing in a preferred embodiment conditional registers 0-7 (CR0-7). FPU 112a and FPU 112b provides information to CR 118 via CR bus 101, utilizing in a preferred embodiment conditional register 1. FPU 112a and 112b also receive and provide information from and to FPR pool 120 via FPR bus 105. FXU 114a, FXU 114b, LSU 116a, LSU 116b output results to CR 118 via CR bus 101, utilizing in a preferred embodiment, conditional register 0. FXU 141a, FXU 146, LSU 116a and LSU 116b also receive and provide information from and to GPR pool 122 via GPR bus 103. GPR pool 122 in a preferred embodiment is implemented utilizing a shadow GPR arrangement in which there are two GPRs 124 and 126. All of the execution units 110–116 provide results to the completion unit 107 via completion bus 109.

Accordingly, with the processor in accordance with the present invention, increased throughput at higher instruction rates can be accomplished through an efficient accessing and translating of the instruction set associated with the processor.

To take full advantage of the operation of the processor 100 several features of the processor are optimized to allow for wider instruction fetches and dispatches while minimizing cycle time and the like. The instruction cache 108 fetches very wide data, for example, 8 instructions per cycle. In order to achieve the highest possible frequency the instruction cache 108 does not align the instruction data based upon the starting address.

In accordance with the present invention, an instruction buffer 300 is provided which can form dispatch groups spanning fetch boundaries while minimizing control complexity and wiring congestion within the processor. The instruction buffer, which in a preferred embodiment allows up to eight instructions to be loaded per cycle, any aligned group of four empty entries to be compressed out of the queue is within the decode unit 104, and allows advancing the buffer either zero entries, four entries, or eight entries per cycle (a fractional portion of the fetch width).

An example of this type of instruction buffer is described in copending U.S. Pat. application Ser. No. 09/263,667, entitled "An Instruction Buffer Arrangement for a Superscalar Processor," assigned to the assignee of this application and filed on even date herewith and is incorporated by reference herein.

The normal mode of a superscalar out-of-order processor is that all accesses to storage are assumed not to be these special address spaces and are decoded and dispatched with no limit to the number of loads and stores per dispatch group. The present invention addresses this performance problem and can be further extended to apply to similar problems where the decode sequence is dependent on the operands of the instructions which are not known at initial decode. To more particularly describe the present invention, refer to the following.

Figure 5:
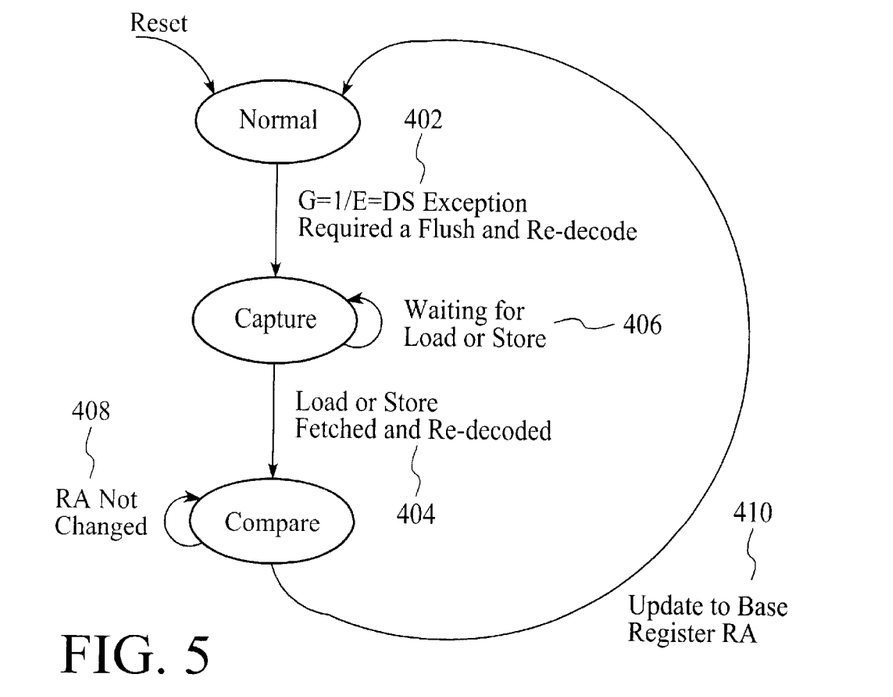
FIG. 5 illustrates a state machine in accordance with the present invention.

FIG. 5 illustrates a state machine in accordance with the present invention. Accordingly, an address is provided to the load store unit. If it is determined by the load store unit that the address is G=1 or E=DS (i.e., safe mode), address space the instruction (and its group and all younger instructions) are flushed, via step 402. The instructions are then refetched and re-decoded and a new series of groups are formed such that only one storage access is present in a given group (except for IOPs which are dependently linked), via step 404.

This can be performed for only the access which initiated the flush, but this is inefficient because it is unlikely that only a single access will be performed to a region of memory. An optimization is therefore possible where the access which initiated the flush can be examined and the following information extracted and used. The indice of the base register can be captured and compared by a register, via step 406 and all storage access instructions which use this indice prior to an update to the base register can be dispatched as single IOP groups, via step 408. When an update is performed to the base register, the register can be cleared allowing accesses using the base register to be dispatched optimally once more, via step 410.

Figure 6:
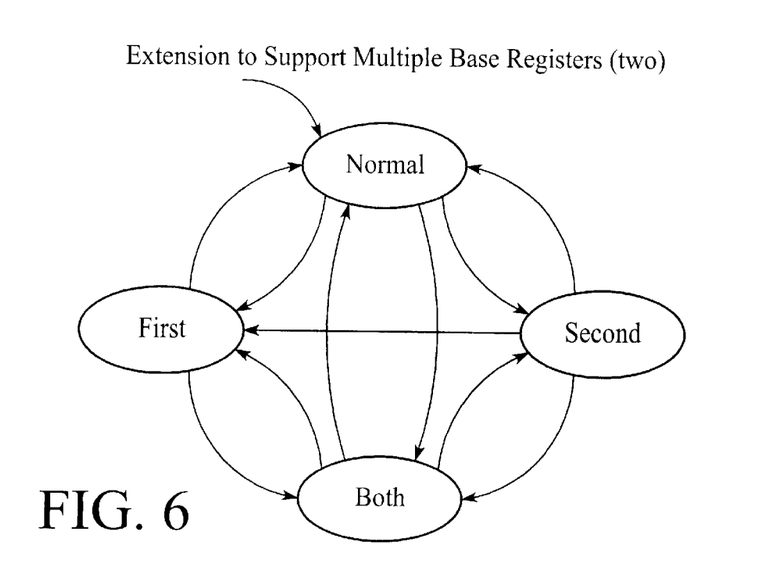
FIG. 6 illustrates an extension of the present invention to multiple base registers.

Referring to FIG. 6, what is shown is an extension to support multiple base registers. In this embodiment two bits acts as an enable for the state machine. If it is deemed necessary to include more than a single register to compare against, this is readily performed, but it is not expected to be necessary since code which accesses G=1 or E=DS space is typically for device which are only likely to access a single block of address space.

Figure 7:
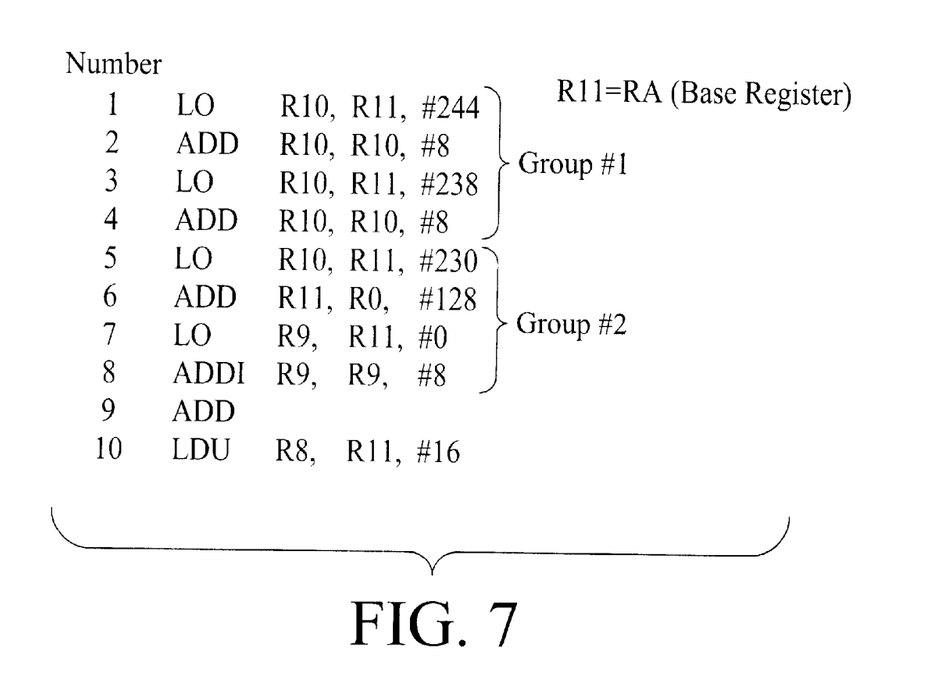
FIG. 7 illustrates an example of the operation of a system and method in accordance with the present invention.

FIG. 7 illustrates an example of the operation of a system and method in accordance with the present invention. Assuming R11=equals the base register and there are two groups of instructions (group 1 and group 2). Then, for example, the load instructions at line 3 have transitioned into safe mode.

Figure 8:
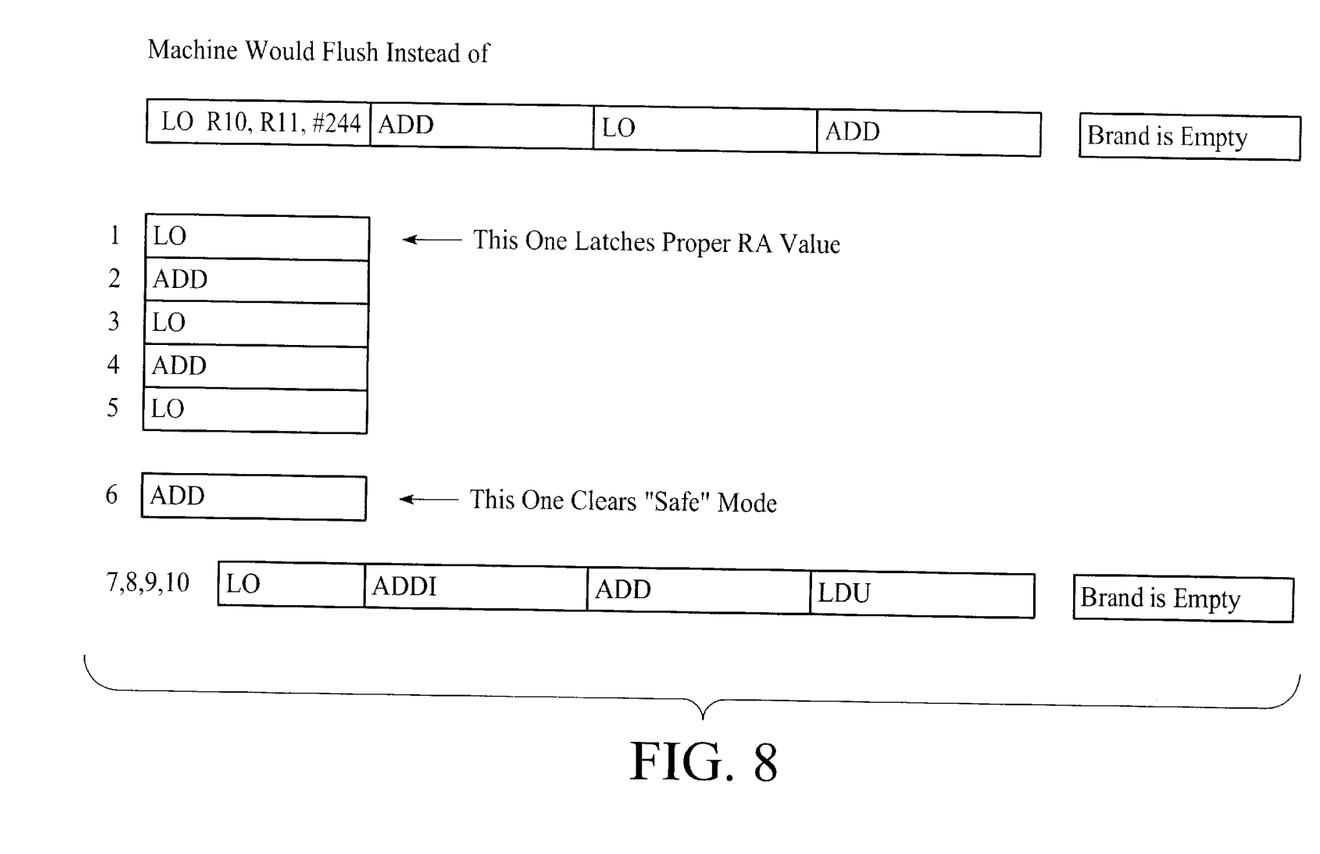
FIG. 8 illustrates a group of instructions dispatched optimally in accordance with the present invention.

The system would then flush instead of having to dispatch single instructions indefinitely, at instruction 6 when R11 is updated, the instructions 7–10 can be dispatched optimally as shown in FIG. 8.

storage access to address space which is safe such as Guarded (G=1) or Direct Store (E=DS) must be handled in a non-speculative manner such that operations which could potentially go to volatile I/O devices or control locations that do not get processed out of order. Since the address is not known in the front end of the processor, this can only be determined by the load store unit or functional block which performs translation. Therefore, if a flush occurs for these conditions, in accordance with the present invention the value of the base register (RA) is latched and subsequent loads and stores which use this base register are decoded in a "safe" manner until an instruction is decoded which would change the base register value (safe means an internal instruction sequence which can be executed in order without repeating any accesses). The value of multiple base registers can be tracked in this manner, though the preferred embodiment would not use more than two, one of the base registers could be for input and one could be for output streams.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for optimizing execution of an instruction stream which includes a very long instruction word (VLIW) dispatch group in which ordering is not maintained comprising the steps of:

examining an access which initiated a flush operation;

capturing an indicia related to the flush operation; and causing storage access instructions related to this indicia to be dispatched as single internal operations (IOP) groups until the indicia is updated.

2. The method of claim 1 wherein a register captures the indicia.

3. The method of claim 2 wherein when an update is performed, the register can be cleared allowing accesses relating to the indicia to be dispatched as a VLIW group.

4. A method for optimizing execution of an instruction stream which includes a very long instruction word (VLIW) dispatch group in which ordering is not maintained comprising the steps of:

examining an access which initiated a flush operation;

capturing an indicia in a register related to the flush operation; and causing storage access instructions related to this indicia to be dispatched as single internal operations (IOP) groups until the indicia is updated, wherein a base register value (RA) is tracked and remains in a "safe" decode mode for loads and stores using a same base register until that register's value is changed to increase performance of a processor, and wherein when an update is performed, the register can be cleared allowing accesses relating to the indicia to be dispatched as a VLIW group.

5. The method of claim 4 in which there is more than one base register.

6. The method of claim 5 further comprising observing data dependent instruction decode in which potential points in the instruction stream change to the data.

* * * * *